Figure 1:
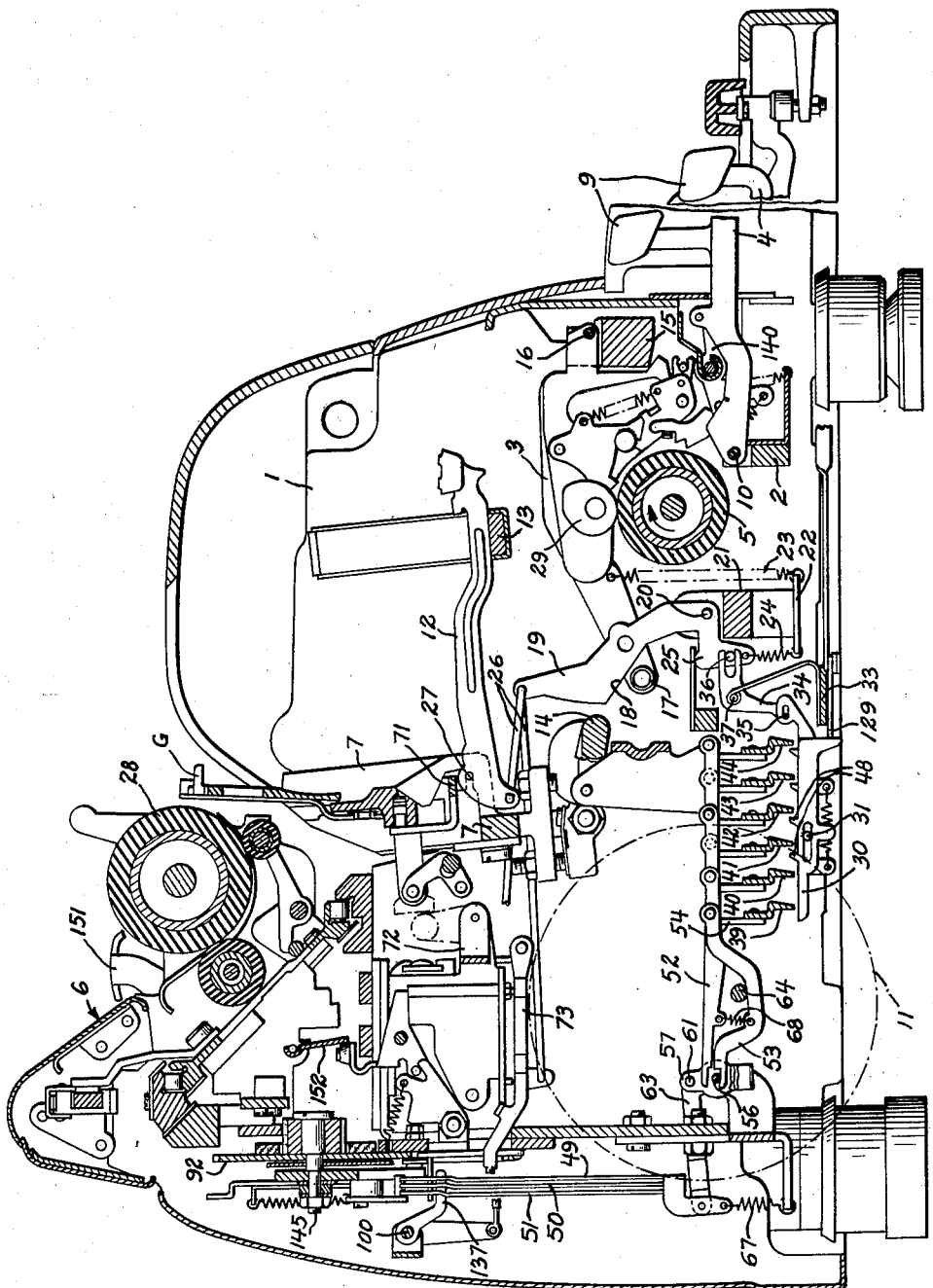

INVENTORS
EDWIN O. ROGGENSTEIN
RUSSELL E. COLEMAN
BY
John J. Lynch
ATTORNEY

Oct. 4, 1960    E. O. ROGGENSTEIN ET AL    2,954,861
PROPORTIONAL SPACING TYPEWRITER

Filed Oct. 2, 1958    9 Sheets-Sheet 3

INVENTOR.
EDWIN O. ROGGENSTEIN
RUSSELL E. COLEMAN
BY
ATTORNEY

INVENTORS
EDWIN O. ROGGENSTEIN
RUSSELL E. COLEMAN
BY
John J. Lynch
ATTORNEY

FIG.8
FIG.9
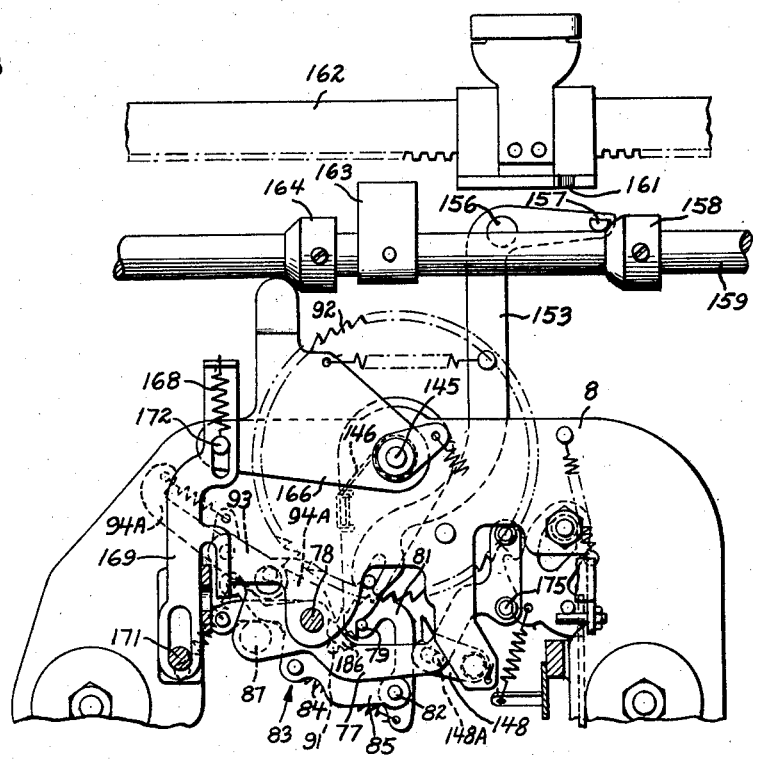
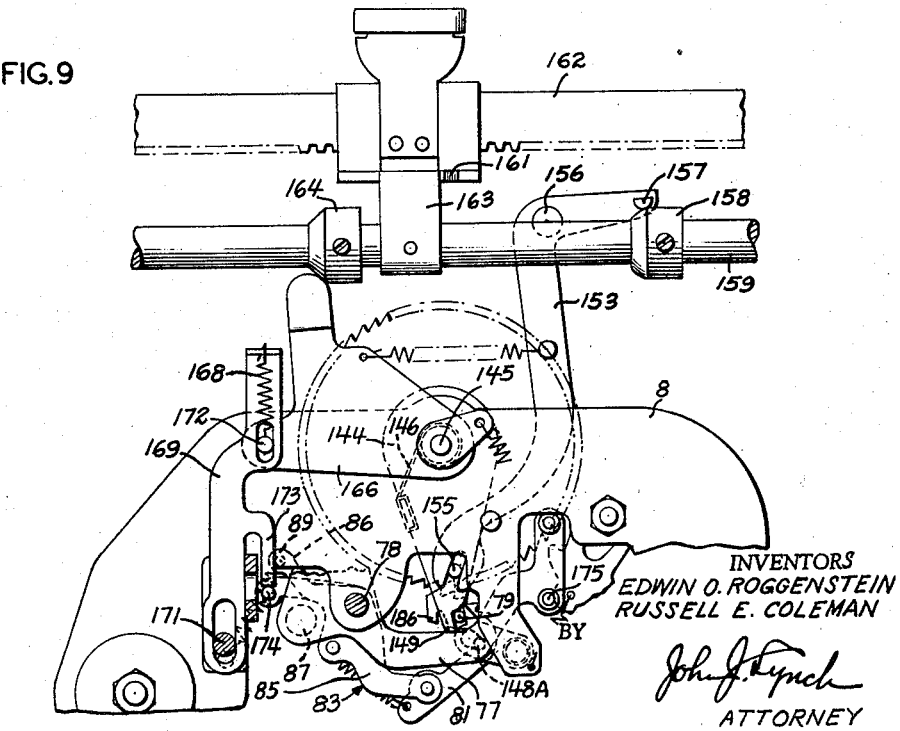
INVENTORS
EDWIN O. ROGGENSTEIN
RUSSELL E. COLEMAN
BY
John J. Lynch
ATTORNEY Oct. 4, 1960  E. O. ROGGENSTEIN ET AL  2,954,861
PROPORTIONAL SPACING TYPEWRITER
Filed Oct. 2, 1958  9 Sheets-Sheet 6

INVENTORS
EDWIN O. ROGGENSTEIN
RUSSELL E. COLEMAN
BY
John J. Lynch
ATTORNEY

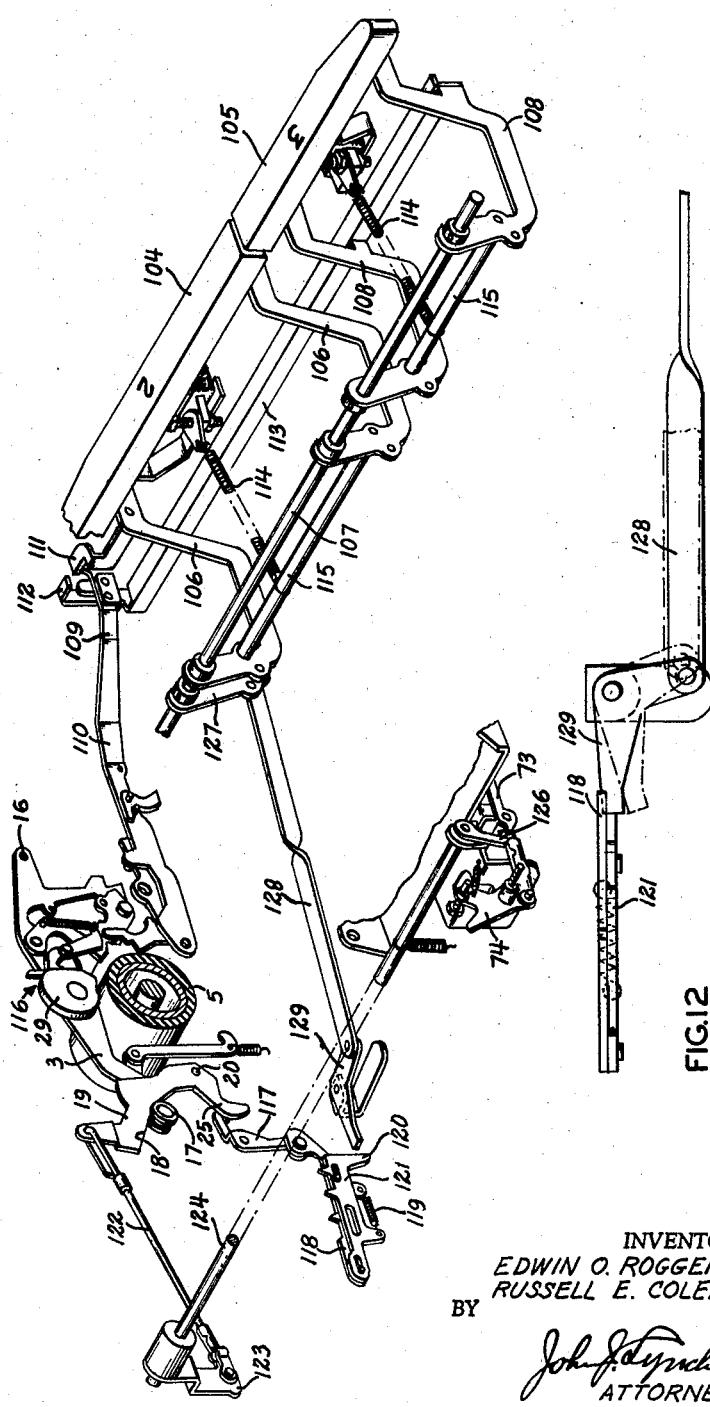

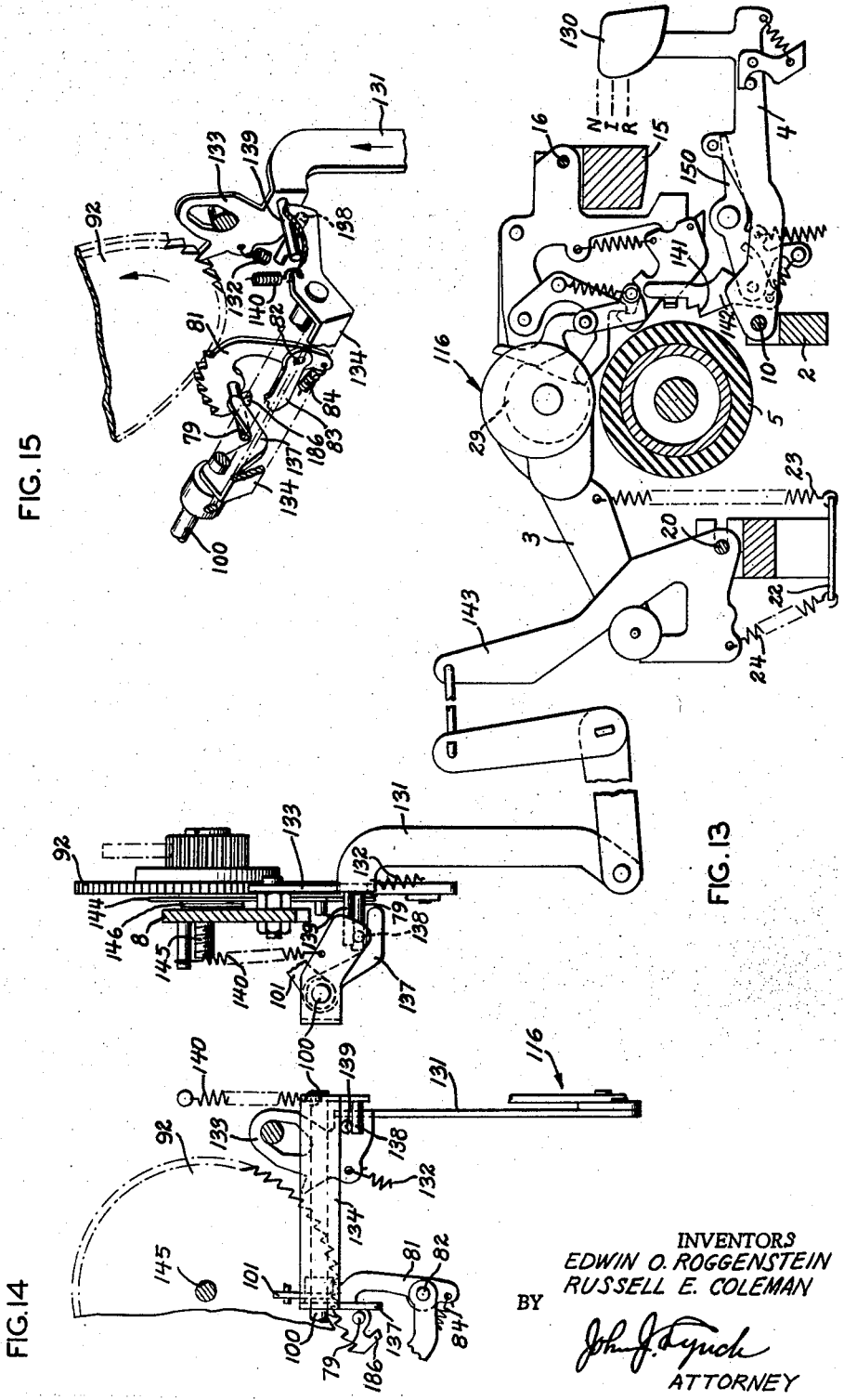

INVENTORS
EDWIN O. ROGGENSTEIN
RUSSELL E. COLEMAN
BY
John J. Lynch
ATTORNEY

United States Patent Office 2,954,861
Patented Oct. 4, 1960

2,954,861

PROPORTIONAL SPACING TYPEWRITER

Edwin O. Roggenstein, Stamford, Conn., and Russell E. Coleman, Elmira, N.Y., assignors to Sperry Rand Corporation, New York, N.Y., a corporation of Delaware Filed Oct. 2, 1958, Ser. No. 764,795

16 Claims. (Cl. 197—84)

This invention relates to typewriters and in particular to one in which the letter space movement of the carriage is in proportion to the width of the characters typed.

An important object of the invention is to provide new and useful improvements in a proportional electric typewriter of the kind disclosed in an application of common assignee Frederick W. Schremp, filed Feb. 17, 1956, Serial No. 566,197, for Variable Letter Space and Margin Control for Typewriters.

Other objects of the invention are to provide carriage escapement means which will permit manual manipulation of the carriage in both directions without noise; to provide left margin and carriage return control means and escapement "contract" and "extend" features for right margin justifying; and to provide an improved tabulator mechanism and rebound check means.

Further objects of the invention include a repeating backspace means for use in connection with an automatic position indicator for quickly positioning characters, to be corrected at the printing point and of the type illustrated and described in an application of common assignee Edwin O. Roggenstein, filed December 17, 1957, Serial No. 703,341; to provide means for adding or subtracting to or from the normal spacing between characters or words, and to provide plural increment space bar means which may be repeated automatically.

Other objects of the invention will be pointed out in the following description and claims and illustrated in the accompanying drawings which disclose, by way of example, the principle of the invention and the best mode, which has been contemplated of applying that principle.

Figure 2:
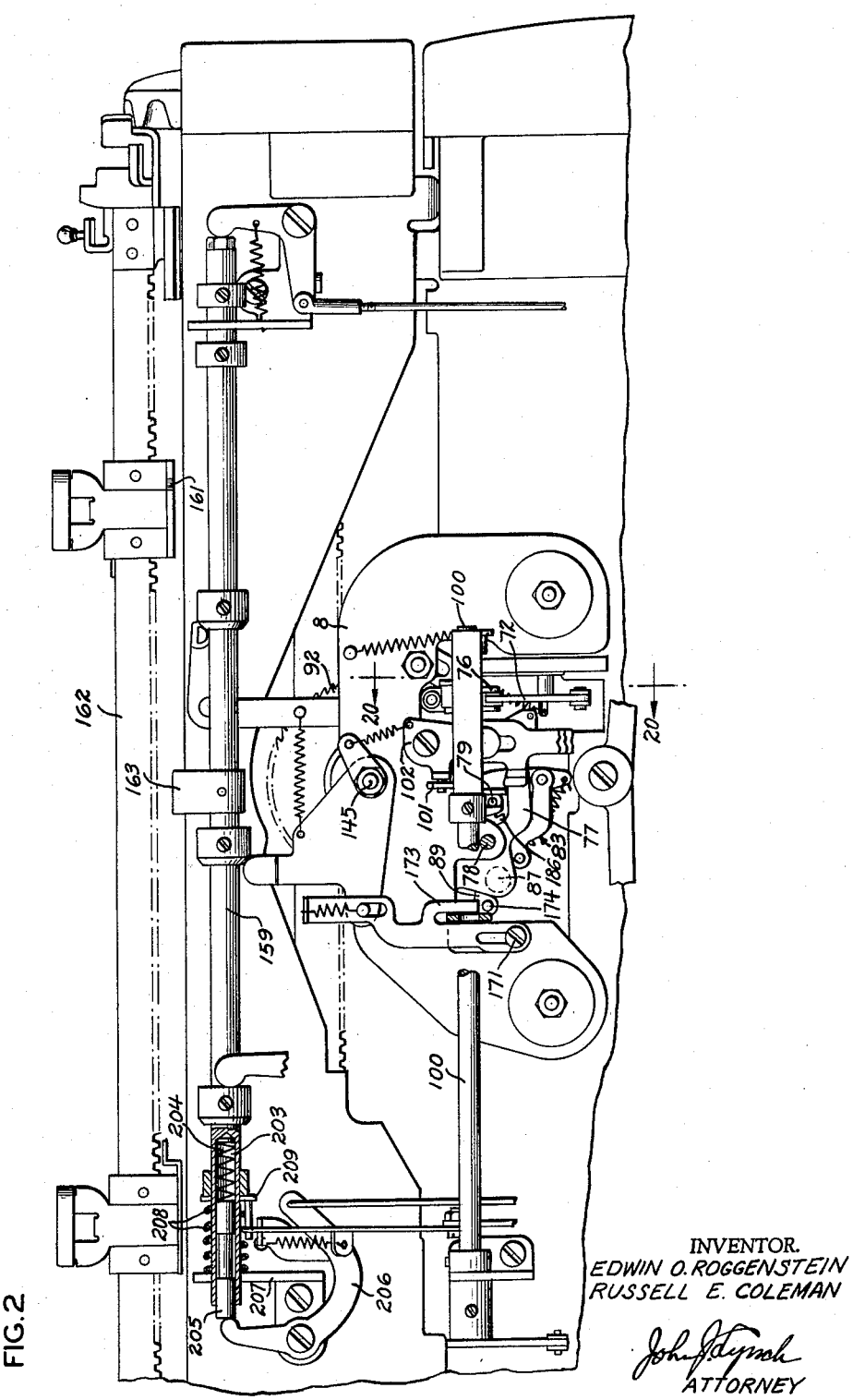
Figure 3:
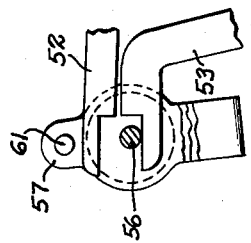
Figure 4:
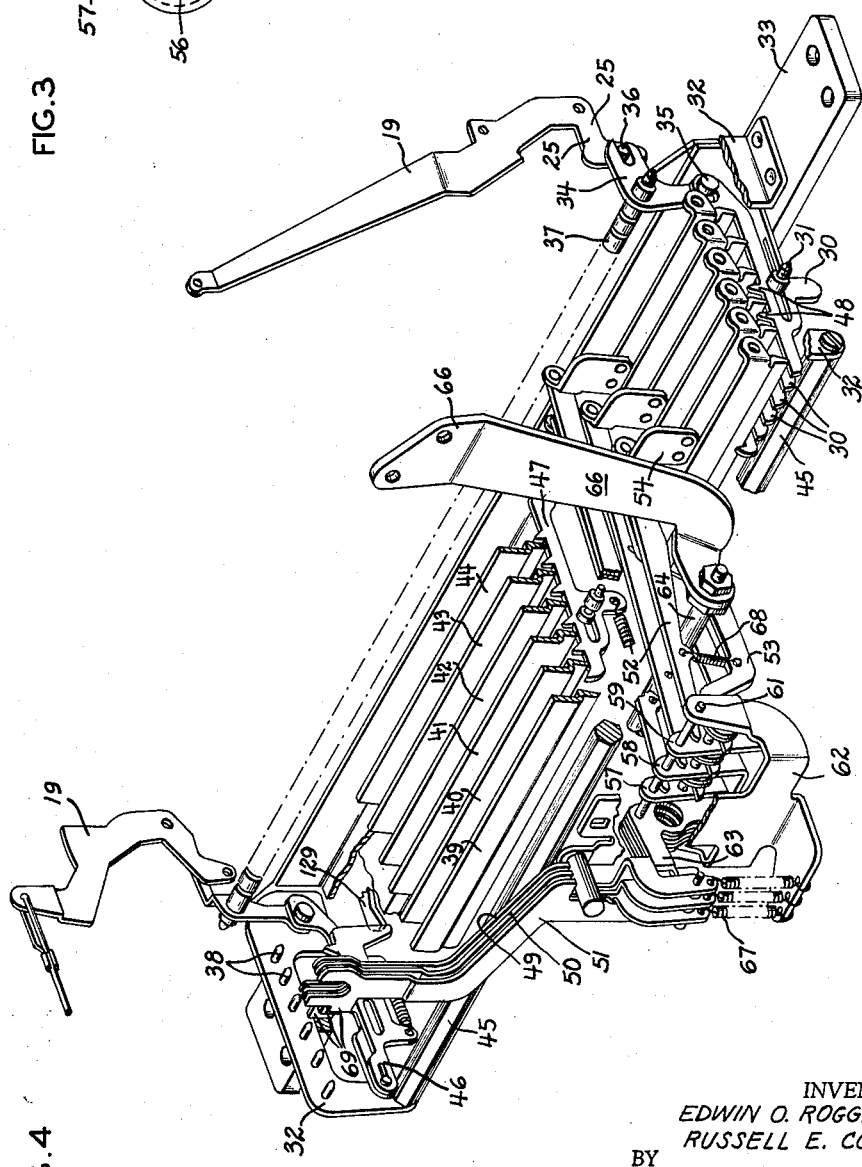
Figure 5:
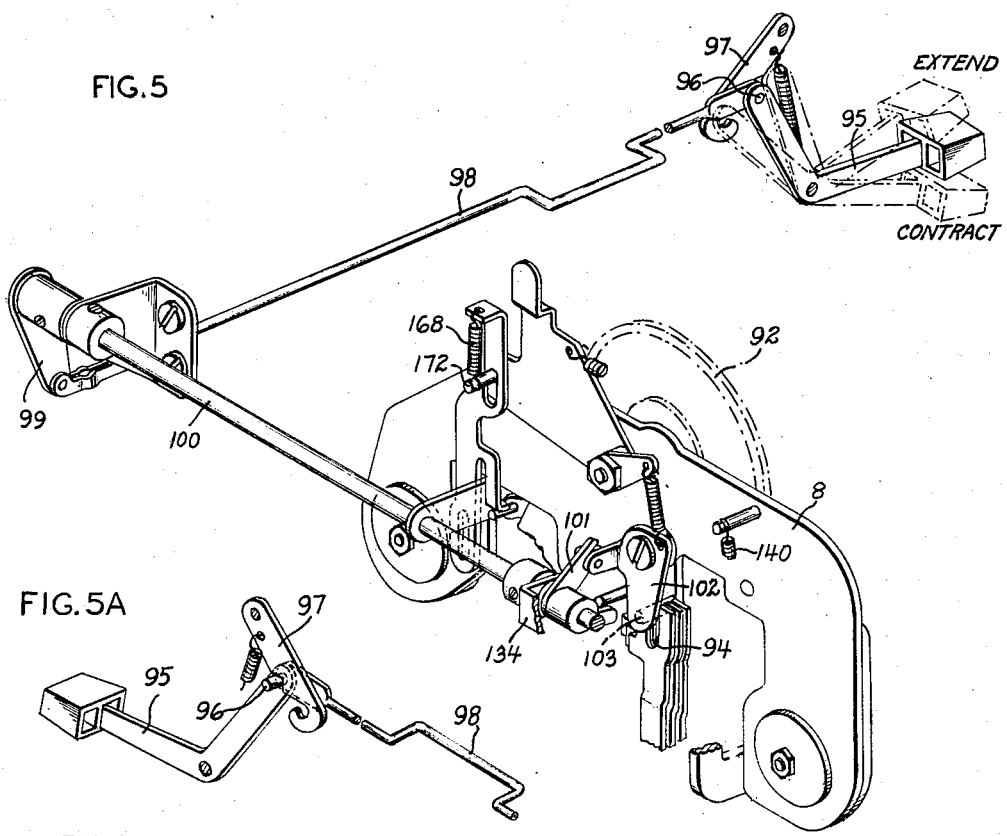
Figure 5A:
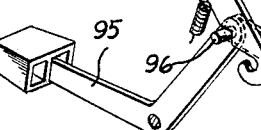
Figures 6, 7:
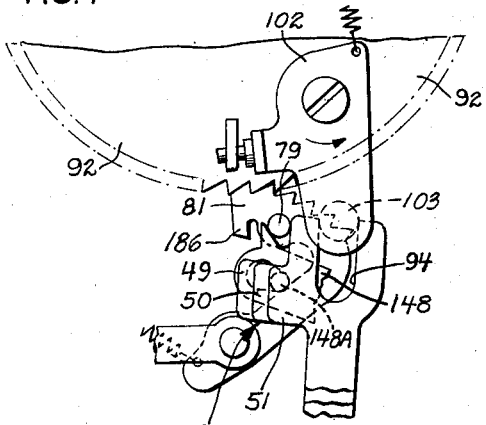
Figure 16:
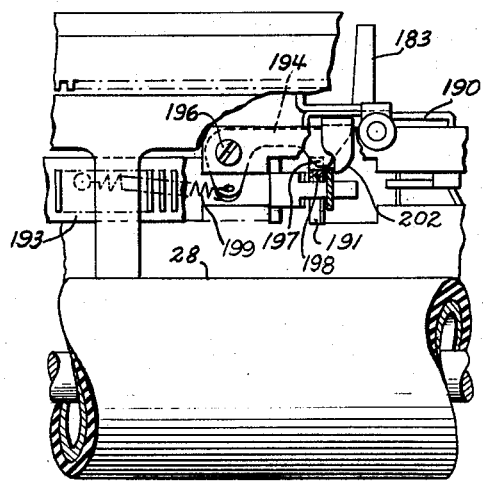
Figure 17:
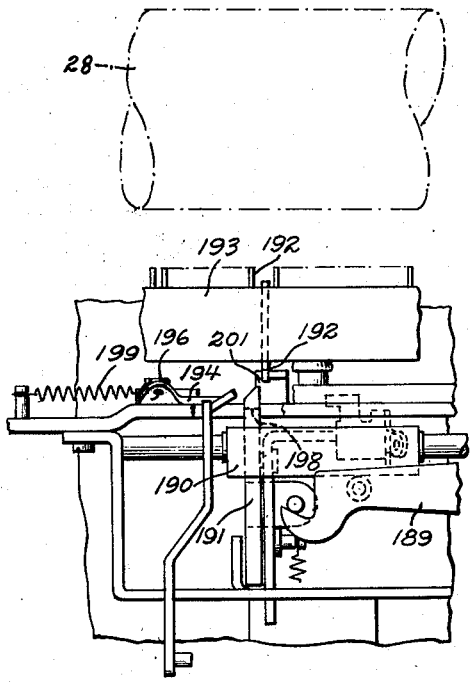
Figure 18:
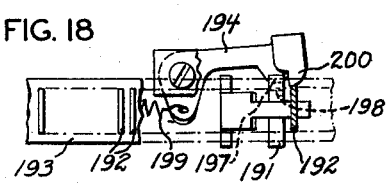
Figure 19:
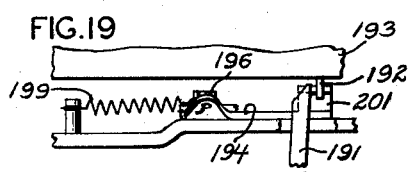
Figure 10:
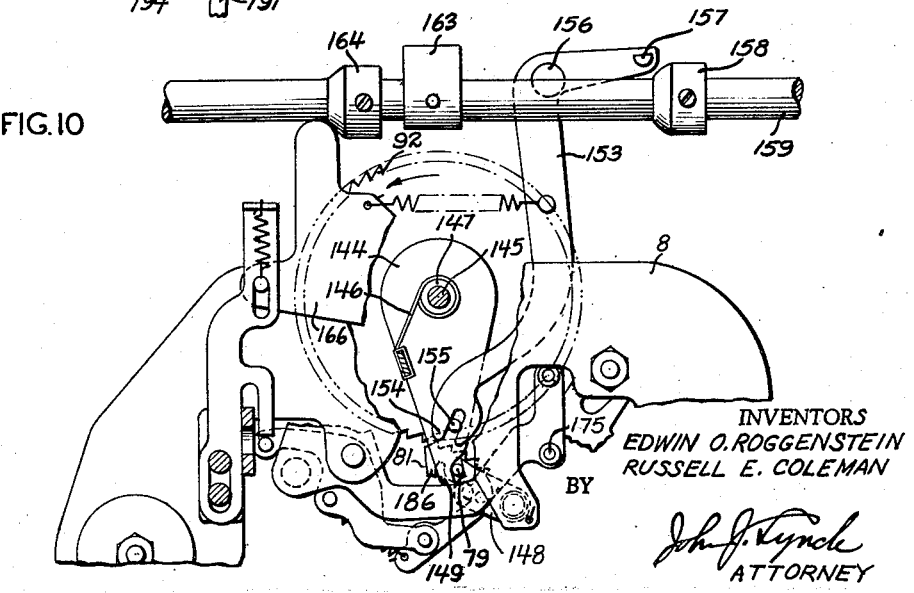
Figure 21:
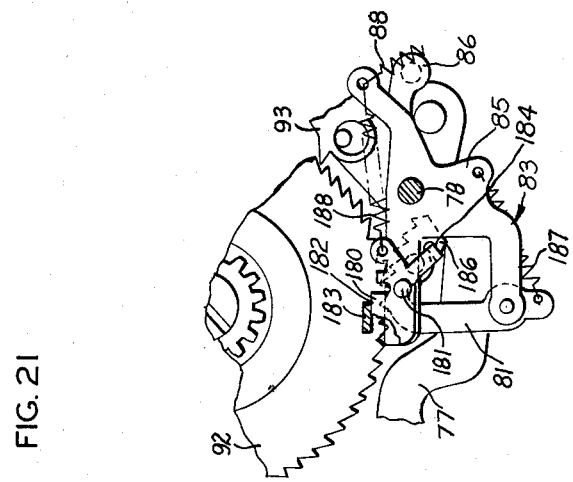
Figure 20:
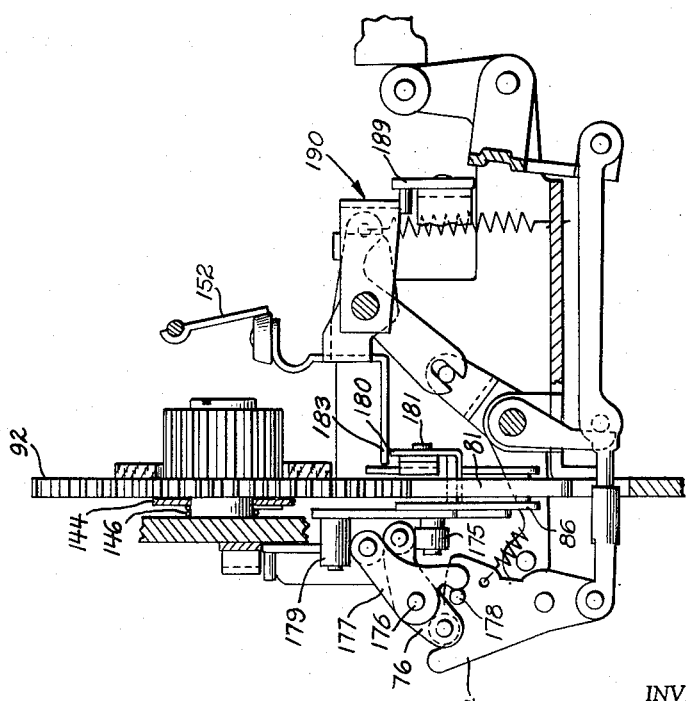

In the drawings:

Fig. 1 is a view in sectional front to rear elevation, through a typewriter, showing the internal mechanism thereof, Fig. 2 is a view in elevation of the upper rear portion of the machine shown in Fig. 1, Fig. 3 is a view in perspective of the proportional spacing mechanism of the machine, Fig. 4 is a sectional detail of a case shift control feature of the mechanism of Fig. 3, Fig. 5 is a view in perspective of letter space adjusting means used in combination with the proportional spacing mechanism to modify the action of the latter, Fig. 5A is a fragmentary view in perspective showing a detail of the mechanism illustrated in Fig. 5, Fig. 6 is a rear face view of part of the mechanism shown in Fig. 5, in one position of adjustment, Fig. 7 is a view similar to Fig. 6 showing the mechanism in another position of adjustment, Fig. 8 is a view looking at the back of the machine illustrating a margin control means in association with the proportional spacing mechanism, Fig. 9 is a view similar to Fig. 8 showing a different adjustment of the parts in operation, Fig. 10 is a view similar to Fig. 8 showing another feature of the invention, Fig. 11 is a view in perspective showing spacing means employed with the proportional mechanism, Fig. 12 is a side view of part of the spacing means illustrated in Fig. 11, Fig. 13 is a sectional view in elevation of the power mechanism and backspace means, Fig. 14 is a rear view of the left end of the mechanism shown in Fig. 13, Fig. 15 is a fragmentary view in perspective showing a detail of the mechanism illustrated in Fig. 14, Fig. 16 is a top view of a tabulating control means showing the use of a carriage rebound check means, Fig. 17 is a view in front elevation of the mechanism shown in Fig. 16, Figs. 18 and 19 are top and front views, respectively, of the rebound check means action, Fig. 20 is a vertical section taken on the line 20—20 of Fig. 2, and Fig. 21 is a rear view of part of the mechanism shown in Fig. 20.

The present invention is described and shown in the accompanying drawings as applied to a Remington power operated typewriter. However, it will be understood that the invention is not limited in its application to the specific machine selected for purposes of illustration but may be applied equally well to other typewriters whether manually or power operated.

The typewriter mechanism, with the exception of certain parts illustrated in this application, is substantially similar to the structure shown in U.S. Patent Numbers 2,289,531, July 14, 1942; 2,304,216, December 8, 1942; 2,326,312, August 10, 1943; and 2,638,199, May 12, 1953, in view of which only a very brief general description will be given of the machine such as will enable the present invention to be readily understood and practiced.

Portions of a Remington typewriter such as shown in the above mentioned patents and patent application are illustrated in the drawings and include spaced parallel side frames 1 which are connected at desired points by transversely extending plates and bars, one of which is a cross bar 2 shown in section in Fig. 1 and others of which will be later described. These side frames 1 support the principal operating mechanisms of the typewriter such as the power arms 3, key levers 4, power roll 5, and paper carriage 6. The conventional type segment designated as at 7 is mounted for vertical movement in guides carried by the side frames 1 to provide for case shifting between upper and lower case characters, in a manner substantially similar to that shown in Patent No. 2,289,531. The side frames 1 are further connected to one another at the rear of the machine by the frame back plate 8 shown in section in Fig. 1 and in rear elevation in Fig. 2. The variable escapement mechanism for the paper carriage is mounted on plate 8 as will presently appear.

Each key lever 4 has a character key 9 and the rearward end of each key is pivoted on a shaft 10, which is supported by the side frames 1 and cross bar 2, as clearly illustrated in the sectional view of Fig. 1. The power roll 5 is rotatably journaled in suitable bearings carried by the side frames 1 and, when the machine is in use, is continuously rotated in the direction indicated by the arrow in Fig. 1, by means of a suitable motor 11 in any conventional and well known manner.

A plurality of type bars 12 are pivotally mounted in the type segment 7, only one central type bar 12 being illustrated in Fig. 1 with the associated operating mechanism for this type bar. A transversely extending segment shift rocker 14 is mounted between the spaced side frames 1 and forms part of the segment case shifting mechanism. A fulcrum bar 15 is mounted in front of power roll 5 and is slotted to receive and pivotally mount a plurality of power arms 3 in spaced parallel relation on pivot rod 16, the latter being mounted on the fulcrum bar 15. As will be clear from Fig. 1 all of the power arms 3 extend rearwardly in transverse relation above the power roll 5 and each power arm has a roller 17 mounted on the free end thereof for engagement with a cam surface 18 on its corresponding type bar bell crank 19. Each bell crank 19 is pivotally mounted on a rod 20 carried by bar 21 extending transversely across the lower portion of the typewriter and secured at opposite ends to said side frames 1.

An anchor plate 22 is mounted on the lower edge of bar 21 to provide an anchor along the front edge for power arm operating springs 23, one being provided for each power arm 3. One end of each spring 23 is anchored to plate 22 and the opposite end to the rear of power arm 3 for normally moving the power arms downwardly toward said power roll about their pivots on rods 16. The rear edge of anchor plate 22 provides an anchor for one end of bell crank operating springs 24 which have their opposite ends attached to rearwardly and downwardly extending arms 25 on bell cranks 19. Springs 24 normally urge bell cranks 19 in a counterclockwise direction, as shown in Fig. 1. A plurality of type bar operating links 26 each have one end pivotally secured to the upper end of an associated bell crank 19 and the opposite end pivotally secured to the heel of an associated type bar 12. The type bars 12 are pivotally secured on pivot rod 27 carried by the type segment 7. Type bars 12 are arranged in arcuate array in the usual manner on type segment 7 for pivotal movement upon rod 27 to have printing engagement with platen 28 (Fig. 1) in the center position and aligned by the usual type guide G in a manner now well understood in the art. A rotatably mounted eccentric 29 is provided for each power arm 3 for cooperation with the power roll 5 upon depression of its corresponding key lever 4.

From the foregoing description it will now be understood that during operation of the typewriter, manual depression of a key lever 4 will engage eccentric 29 with the continuously rotating power roll 5 to move its power arm 3 clockwise on pivot rod 16, which in turn, through roller 17, rocks type bar bell crank 19 clockwise on pivot rod 20. Rocking movement of bell crank 19 in turn, through link 26, throws type bar 12 counterclockwise (Fig. 1) on its pivot rod 27 for printing a character on paper placed about the platen 28 in the well known manner.

In conventional typewriters the paper carriage is moved a uniform distance in letter spacing direction (usually 1/10 of an inch for pica type) after each character is typed and such carriage movement is under the control of an escapement mechanism that is operated each time a key lever or the space bar is depressed. However, in variable spacing typewriters, paper carriage movements in letter spacing direction are selectively varied in proportion to the widths of the characters typed.

In describing the variable or proportional spacing mechanism, according to the present invention, the indexing or space selecting mechanism for paper carriage movement, and its cooperation with the type actions, will be described first. This mechanism is illustrated in Figs. 1, 3 and 4 and is largely mounted beneath and to the rear of the power roll 5 and is operated by the type bar bell cranks 19. As shown in Fig. 3, a plurality of transversely spaced permutation slides 30, one for each type action, are slidably mounted upon a transverse rod 31 carried by a depending portion of a bracket 32 which is mounted upon and secured to a cross bar 33, the opposite ends of which bar are attached to the side frames 1. Fore and aft sliding movement is imparted to the permutation slides 30 through bell crank levers 34, the lower ends of which are pivotally connected at 35 to the forward ends of said slides and the forwardly extending bifurcated ends of which cooperate with rollers or studs 36 projecting sidewardly from arms 25 of the bell cranks 19. The bell crank levers 34 are pivotally carried by a transverse rod 37 mounted in the bracket 32.

It will now be observed that each time a type bar bell crank 19 is rocked clockwise on its pivot shaft 20, by its associated power arm 3 through roller 17, Fig. 1, the corresponding permutation slide 30 will be drawn forwardly upon rod 31 through counterclockwise movement of its corresponding bell crank lever 34. Forward movement of the permutation slides 30 is utilized to selectively impart counterclockwise rotation to six transversely extending permutation bails 39, 40, 41, 42, 43 and 44, in a manner to be later described. The opposite ends of each bail are pivotally mounted on spaced parallel end studs 38 of a bracket 32. The end plates of the carrier bracket are connected to one another by a tie bar 45.

The proportional spacing is controlled through the bails 39 to 44 inclusive and the slides 30, from the type bar bell cranks 19. There are as many slides as there are bell cranks to permit operation of the desired bail for a particular character, except where both upper and lower case characters require five increments of carriage spacing. A special space slide 46 is provided for the two and three increment space bars as well as a spring urged bail return slide 47 which assists the bails to return faster to normal or rest position. The slides 30 are provided along their top edges with lugs 48 arranged in such a manner as to actuate the desired bails in either upper or lower case positions.

Since, in some cases, the lower case character has a different unit of spacing than the upper case character, two permutation bails operate from only one slide 30 for two, three or four increment characters. The five increment character requires no operation of the permutation unit because the stop arms 49, 50 and 51 are arranged to allow a controlling sector in the escapement to advance five units if they are not elevated, or remain at normal or rest position. The bails 39 to 44 operate the stop arms 49, 50 and 51 through three sets of stop setting arms, each set including an upper arm 52 and a lower arm 53 each being pivoted at one end to a bracket 54 attached to each of the bails 39 to 44 and extending rearwardly in spaced apart relation as shown in Fig. 4 at their free ends to lie above and below stop actuator bracket rocker studs 56 (Fig. 4) carried in the stop rockers or actuators 57, 58 and 59. The latter are mounted for swinging movement on a shaft pin 61, carried in a stop bracket 62 secured to the rear frame plate 8, and have extensions 63 for pivotal engagement with the stop arms 49, 50 and 51 to raise the latter against the resistance of their springs 67.

As above noted, each stop setting arm 52 of each pair is secured at one end to an upper case bail 40, 42 and 44 while each arm 53 of a pair is secured at one end to a lower case bail 39, 41 and 43. A case shift stud 64, carried in a bracket 66 secured at its upper end on the rear of the type bar shift segment 14, overlies the lower arms 53 of each pair, so that when the segment 14 is lowered to produce upper case typing, the stud 64 will pull down the free end of arms 53 out of register with a rocker stud 56 in each of the stop actuators 57, 58 and 59. Each upper arm 52 is connected by a spring 68 with the companion lower arm 53 and when the latter is forced downwardly by stud 64 the upper arm 52 is pulled down into register with the rocker stud 56 of each actuator. Thus the selection of upper or lower case increment adjustment is automatically carried out by the operation of the shift mechanism which lowers the pivotal point of the type bars to obtain upper case typing. The space desired for each character having been allotted, the type bar bell crank 19 is connected to the corresponding permutation slide 30 which, when operated, will rock the proper permutation bail. If the character "h" is typed in lower case the lower arm 53 of the two increment set of arms 52, 53 will elevate the stop bar 49 so that the sector will have a movement representing three increments of letter space. If the character "H" is typed in upper case the operation of the stud 64 will condition the upper arms 52 for operating the case shift stud 56 automatically and when the corresponding permutation slide 30 is operated the arm 52 of the four increment set of arms 52, 53 will elevate the stop bar 51 so that the sector will have a movement representing four increments of letter space. If no movement of the stop bars 49, 50 and 51 occurs the increment spacing for the letter will be five. The length of the tabs 69, on the upper ends of the stop bars, determines the extent of movement of the sector, as will be now explained.

When a character key 9 is depressed the power mechanism (Fig. 1) operates the corresponding power arm 3 and type bar bell crank 19 to set the proper sector stop arm 49-51, through a bell crank 34 and the permutation mechanism, and to also throw the type bar 12 to printing position. As printing occurs, the heel of the type bar moves the universal bar 71 to rock an oscillator 72 to pull on a link 73 and swing an escapement rocker cam 74 (Fig. 20) to cause a lever arm 76 to rock a detent rocker 77 (Fig. 8) about its pivot 78 on the back frame plate 8. When the corresponding stop arm is raised, its stop extension will be in the path of a stop pin 79 carried by a sector or stop segment 81 which is pivoted as at 82 in the lower end of a sector carrier 83, and biased in clockwise direction by spring 84. The carrier is pivoted to detent rocker 77 on pin 78 and comprises spaced holders 85 and 86 which are also pivoted on pin 78. A pin 87 projects from detent rocker 77 against which the holders limit in counterclockwise movement under tension supplied by a spring 88 leading from an arm 89 of the holder 86 to the back plate 8. A pin 91 between the holders also limits the swing of the sector counterclockwise as the gear 92 rotates under the letter spacing movement of the carriage, which is urged in letter spacing direction by the usual spring drum and belt combination found in most typewriters.

In the letter spacing operation, when the proper stop bar is raised, the detent rocker 77 is pivoted to swing a spring biased pawl 93, carried on an arm 94A of the rocker 77, into holding engagement with the gear 92 to prevent carriage movement while the sector 81 is lowered out of mesh with the gear, to pivot in clockwise direction under the influence of the spring 84, until its pin 79 engages the stop that has been elevated to define a two, three or four increment swing of the sector. If no stop has been raised, the pin will limit against the extended upper end of all the stops to define a five increment space. As the sector strikes the stop it is raised into meshing engagement with the gear 92, and, when the oscillator 72 is restored to normal at the end of the type stroke, the detent rocker 77 will withdraw the pawl 93 and the carriage will move the space increment proportionate to the swinging or return movement of the sector, while it is in mesh with the gear and until it strikes the stop pin 91, when it will hold the carriage at the end of its letter increment movement.

Referring to Figs. 5, 6 and 7 an increment varying feature of the invention is shown. It will be understood that the stop arms 49-51 each have at the upper end thereof a slot 94 and a tab 69 against the latter of which the pin 79 of the sector 81 limits in its increment defining movement. If the stop bar 51 is raised it will limit the movement of the sector to a distance corresponding to a four increment movement of the carriage. The width of each letter is measured in units or increments of space and is allowed a proportional amount of space. The smallest letter space is two increments and the longest is five increments and the regular spacing between words is two increments which may be varied by the mechanism shown in Fig. 5 which comprises a bell crank finger lever 95, adjacent the keyboard, having a pin 96 coacting with a spring urged detent 97 to yieldably maintain the lever 95 at one of three positions. In the middle position the normal operation of the proportional stop bars 49-51 occurs but if the operator wishes to add one increment to extend the word or character space beyond the alotted amount, she lifts the lever 95 to the "extend" position which, through link 98 and arm 99 rocks a space adjusting shaft 100. The latter has secured thereto a yoke finger 101 which actuates a spring biased change-of-direction arm 102 having a pin 103 passing through the slot 94 in the upper end of each stop arm 49-51. The latter are somewhat flexible and when arm 102 is swung counterclockwise as in Fig. 7 the stop arms, as a group, are moved backwards or to the right one increment of space so that the pin 79 of the sector will move one increment further to so extend the space, that would be indicated by the regular or manual movement of any stop arm 49-51. In like manner, when the space between words or characters is to be contracted by one space increment the lever 95 is pushed down to "contact" position and the arm 102 will move one unit in clockwise direction as shown in Fig. 6 to lessen the distance the pin 79 will travel in defining a selected increment of spacing. In typing, in order to emphasize words, headings, captions and the like, the extend key is operated to add an extra unit or increment of space between characters or words automatically and to also subtract increments where deemed desirable as in justifying typed copy to even the right margin thereof.

For the purpose of quickly and accurately spacing the typed matter, use is made of two space bars 104, 105 for two increment spacing and for three increment spacing, respectively, the mechanism of which can also be modified in operation by the "extend" and "contract" features described to cause the two increment space bar to space three units while the three increment space bar will space four units. The spacing mechanism (Fig. 11) consists of the two increment space bar 104 which through arms 106 pivots on shaft 107 and a three increment space bar 105 which through arms 108 is secured to and rocks shaft 107. The forward end 109 of a power mechanism control lever 110 underlies an extension 111 of arm 106 and also underlies an extension 112 carried by a bar 113 connecting the arms 108 together. Both space bars are biased to their raised or normal positions by springs 114 connected to the reinforce bars 115 of the space bar structures. The control lever 110 is actuated by either space bar, and by operation of the power unit 116 associated therewith, which is of the repeat type to be explained later, causes type bar bell crank 19, at its lower end to operate bell crank 117 and pull forwardly the three increment permutation slide 118. The latter is connected by a spring 119 to the two increment slide 121 so that both move forwardly together. When the two increment space bar 104 is operated the two and three increment permutation bails 57, 58 (Fig. 4) in both upper and lower case will be operated and will cause the two and three increment stop bars 49 and 50 respectively (Fig. 7) to rise so that the stop pin 79 on the sector will be intercepted by the two increment stop bar 49 and the carriage will space two increments. When the power arm 19 is actuated as above the upper end thereof pulls on a tie-rod 122 and an arm 123 to rock a space shaft 124, behind plate 8, from which shaft depends a finger 126 for pushing the spacing link 73 rearwardly to operate the escapement rocker cam 74 and inaugurate the action of the proportional spacing mechanism as above described.

When the three increment space bar 105 is depressed, the power mechanism 116 is operated and through shaft 107, arm 127 and a link 128 a detent 129 is swung into the path of a depending portion 120 of the two increment slide 121 with the result that only the three increment slide 118 will operate the three increment bails to raise the proper stop bar and let the carriage move three increments of space.

When backspacing is to be done, the operator will press the backspace key 130, Figs. 13, 14 and 15 which, as fully disclosed in U.S. Patent 2,714,948, can be depressed to a first low position to cause the power mechanism or unit 116 to give a single upward movement to the backspace arm 131 against the resistance of its spring 132 to cause the backspace pawl 133 formed at the upper end of the arm to turn the gear 92 one increment in reverse direction to move the carriage back one space. If additional backspacing is necessary to bring a character to be corrected to proper position, as determined by an automatic position indicator, as disclosed in the application Serial No. 703,341 above referred, the operator further depresses the key 130 to the lowest position and the backspacing is automatically repeated as often as necessary without repeated operation of the key 130. When the sector 81 is in normal position, as shown in Fig. 8, it is in mesh with the gear 92 and is held against the pin 91. The teeth of both the sector and the gear have a rake that will permit the gear to ratchet over the teeth of the sector as backspacing is being done. The sector acts as a detent to prevent clockwise or retract movement of the gear during backspacing and in order to prevent swinging movement of the sector with the gear, use is made of a backspace bail 134, Fig. 13, which is mounted for rocking movement on the shaft 100 and is urged in counterclockwise direction, by a spring 140. The bail, at its opposite ends, carries a detent finger 137 and a follower pin 138, the latter of which underlies a pin 139, extending from the side of the backspace pawl 133, and is maintained under upward pressure by the bail spring 140. When the backspace pawl is lifted, the pin 138, following the upward movement of pin 139, will allow the spring 140 to rock the bail 134 to bring the detent finger 137 thereof into alignment with the pin 79, carried by the sector, to prevent any swinging movement of the latter and to maintain it in position to be operated when the next operation of the machine takes place. It is essential for accuracy that close control be maintained in the movement or holding of gear 92 which is constantly under the moving pressure of the usual carriage feed spring and belt.

Repeat backspacing is accomplished by the operator depressing the key 130 to the R. (repeat) position to swing the trip rocker 150 so that a second release shoulder 141 on the trigger 142 secures repeat operation of the power arm 3 of the power unit 116 to operate the repeat bell crank 143, all as fully described in the Patent 2,714,948 above referred to.

In order that the carriage may be returned to left margin position, or moved by the operator in either direction without a ratcheting noise created by the teeth of the gear 92 and the sector or segment 81, use is made of a torque arm or silencer cam 144 (Figs. 8, 9 and 10) mounted loosely on the escapement shaft 145 and connected to the latter through a coil spring 146 which surrounds the shaft and is designed to contract about the hub 147 of the escapement wheel or gear 92, which is fixed to the shaft 145, as the carriage moves toward the left margin. The spring 146 will move the arm 144 counterclockwise to bear against the pin 79 of the sector to follow the latter as the wheel or gear 92 moves in counterclockwise direction and when the pin 79 contacts a stop dog 148, a cam end 149 on the lower end of the arm 144 forces the pin down along the edge of the dog to cause the sector to be disengaged from the teeth of the gear and, by the torque applied by the spring 146 on arm 144, holds the sector out of range of the moving teeth of the gear so that the movement of the carriage is without noise. When the carriage is to be moved manually, the operation of the usual finger latch 151 (Fig. 1) operates the escapement bail 152 to lower the segment carrier 83 to disconnect the segment 81 from meshing engagement with the teeth of the gear 92 (Figs. 20 and 21).

The cam arm 144 is also used for the purpose of providing a rebound check by locking the sector or stop segment 81 in a fixed position when the carriage is moved to the left margin position and is operated by a spring biased left margin bell crank lever 153 having a lower forked end 154 fitting over a pin 155 on the face of the cam arm 144 near the lower end of the latter. The bell crank lever 153, suitably pivoted as at 156 to a part of the back frame, has, at its free end, a pin 157 extending into the path of movement of a cam collar 158 fixed to a control rod 159. During normal typing operations the mechanism is as shown in Fig. 8, but when the carriage is moved in carriage return direction, the arm 144, Fig. 10, is swung counterclockwise to cam the sector 81 out of mesh with the gear 92 and hold the pin 79 thereof against the stop dog 148. When the left margin stop 161, which is adjustable on the stop rail 162 of the carriage, limits against the fixed stop 163 on the control shaft 159, as shown in Fig. 9, the shaft will be moved to the left so that the cam collar 158 will ride under the pin 157, to rock the lever 153 and apply pressure to the arm 144 to prevent any rebound of the sector as the carriage comes to rest at the left margin position. The stop dog 148 (Figs. 8 and 9) pivoted to plate 8 is operated by a pin 148A in the detent rocker 77, when the latter swings down, to pull the dog down out of the way of pin 79 when extended typing is desired.

The control shaft 159 also carries a loading cam collar 164 which swings a bell crank plate 166 about its pivot on the escapement shaft 145, when the control rod or shaft 159 moves leftwardly (Fig. 9) under the impact of the margin stop 161 striking the fixed stop 163, to place a coil spring 168 under tension to pull down a slide detent 169, which has suitable pin and slot connections 171, 172 with the back plate 8 and crank plate 166, respectively. The slide detent 169 is provided with a detent extension or leg 173 which lowers to engage a pin 174 in the holder 85 of the sector carrier 83. The purpose of this assembly is to apply the force of the spring 168 to the sector 81 to force the latter into positive engagement with the gear 92 without rebound. Otherwise, to accomplish this it would be necessary to apply a spring of such tension, in place of spring 88, that the escapement would be overloaded during normal typing.

When the escapement is operated by the swinging action of the spring biased escapement rocker cam 74 (Fig. 20) and lever arm 76, bearing against a lower roller 175 on the detent rocker 77, the latter is lowered to take the sector out of mesh with the gear for its increment defining swing toward the sector stop bars. In order that the sector may be positively moved back into engagement with the gear, the lever arm 76 is mounted on a common pivot pin 176 with a return lever 177, whose lower depending end is pushed by a pin 178 on the rocker cam 74, to cause the upper end of the return lever 177 to exert a lifting force on a roller 179 on the detent rocker 77 and positively force the sector 81 into engagement with the gear 92.

In order to prevent relative movement between the sector and the gear, when tabulating operation of the machine takes place, use is made of a tabulating detent 180 (Fig. 21) which is pivoted on the holder 86 of the carrier 83 as at 181 so that a horizontal edge 182 thereof extends above the top edge of the holder 86 with enough clearance to allow the tabulator extension 183 to rock the detent 180 to cause a tail 184 thereof to engage in the opening of a hooked end 186 of the sector 81 to prevent the latter from swinging as the extension 183 rocks the holder 86 about its pivot 78 against the action of its spring 187. When the tabulating movement of the carriage is completed, the extension 183 lifts and a spring 188 rocks the detent 180 about its pivot to pull the tail 184 out of holding relation with the sector 81 which has been moved into mesh with the gear 92 and is held thereby until the next character key or spacing key is operated. Operation of the extension 183 is through the usual tabulator bell crank 189 (Fig. 20) which operates the release rocker 190 of which the extension 183 forms a part. The bell crank also raises the tabulator stop bar 191 which is shifted upwardly into the path of the tabulator stops 192 that are set in the well known manner to project downwardly from a stop rack 193. When the tabulator key is pressed, the carriage moves free in letter space direction until a stop 192 strikes the stop bar 191 to halt the carriage. The momentum of the carriage is such that rebound may occur at this time and in order to prevent this, a rebound latch 194 (Fig. 16) pivoted as at 196 to a suitable fixed part of the mechanism, is spring urged to cause a nose end 197 thereof to yieldably engage one edge of the stop bar 191 in which a side edge recess 198 is provided. When the stop bar is raised, the nose of the latch, under the urge of its spring 199, will enter the recess and cause a detent prong 200 of the latch to lie in the path of a stop 192. The free end of the latch is upwardly offset (Fig. 17) as at 201 to terminate in the shouldered detent prong 200, one side of which is bevelled as at 202 to allow a stop to snap thereover and come to rest against the stop bar 191 and hold the carriage from rebound movement, which would result in improper positioning of the proportional spacing mechanism parts. At soon as the tabulator stop bar 191 lowers, the nose 197 of the latch rides out of the recess 198 and takes the detent prong 200 out of the path of the stops 192 so that, if necessary, the carriage can be moved in return direction.

When the carriage is returned to left margin position, it is advantageous to have the return belt and clutch in operation until the carriage has settled in definite left margin position and for this purpose we provide a clutch control (Fig. 2) consisting of a bore 203 in the right margin end of the control rod 159 in which is disposed a compression spring 204 and a plunger 205 bearing against the spring at one end and extending out of the bore at the opposite end to engage a clutch lever 206 pivoted to a bracket 207 forming an abutment for one end of a heavier spring 208 coiled outside the rod 159 and bearing against a collar 209 fixed to said rod. When the left margin stop 161 strikes the fixed stop 163 on the rod, the latter will move against resistance of the spring 208 to place the spring 204 under compression until the carriage comes to rest at which time the spring 204 will project the plunger and, through the clutch lever 206, will disable the clutch and stop the action of the belt used to restore the carriage to left margin position.

For extended spacing, the lever 95 is flipped up and will remain there until the operator resets the same to normal position. For "Contract" the operator holds the lever down manually while typing one or more characters for condensing the line or for indicating the number of spaces on the written copy when preparing an original work sheet for justifying. If the lever 95 could remain in "Contract" position, the left margin would be out one increment or space after a carriage return. This is avoided because the lever is automatically restored to normal position after it has been depressed.

While there have been shown and described the fundamental novel features of our invention, it will be understood that various omissions, substitutions and changes in the form and details of the mechanism and in its operation may be made by those skilled in the art without departing from the invention and it is the intention, therefore, to be limited only as indicated by the scope of the following claims.

What we claim is:

1. In a typewriter or like printing machine having a movable carriage, a plurality of typing keys, and a series of type bars actuated upon depression of their corresponding typing keys, variable spacing mechanism for the carraige comprising: an escapement member; means detachably coupling said member and said carriage; an indexing mechanism operable in response to depression of said keys; a plurality of index stops selectively settable by the indexing mechanism and cooperable with the escapement member to effect variable movement of the carriage as determined by the setting of said stops, and auxiliary means for altering the setting of said stops to further vary the movement of said carriage.

2. In a typewriter or like printing machine having a movable carriage and left margin defining stop means associated therewith, a plurality of keys and type bars controlled by said keys, variable feed mechanism for the carriage comprising: an escapement gear; driving connections between the gear and the carriage; a pivoted escapement sector normally engaged with said gear; spring means for yieldably holding the sector in engagement with the gear; means including a pivoted sector holder responsive to operation of said keys to disengage said sector from said gear and subsequently re-engage the sector and gear; a slide detent means engaging said holder index means selectively settable by operation of the keys for varying the extent of movement of the sector in one direction when it is disengaged from said gear; means including said carriage for moving the sector in the opposite direction upon re-engagement with said gear whereby the movement of the carriage in letter spacing direction is equal to the movement of the sector during the time it is disengaged from said gear; a loading cam, bell crank means, a spring joining said bell crank means and said slide detent means for augmenting the pressure of the said sector spring means and means operated by said stop means for operating said loading cam when the carriage is in left margin position, to increase the tension of the spring connecting said bell crank means and said slide detent means.

3. In a typewriter or like printing machine having a movable carriage, variable feed mechanism for the carriage comprising: a plurality of depressible keys; a series of type bars actuated upon depression of their corresponding keys; a rotatable escapement gear; separable driven connections between said carriage and the gear; an escapement sector normally engaged with said gear; means responsive to depression of said keys to disengage the sector from the gear; index means selectively settable in response to depression of said keys to vary the extent of displacement of said escapement sector from a starting position after it has been disengaged from said gear; means including said carriage to reversely move said sector and gear in unison upon re-engagement with one another until the sector has returned to said starting position to thereby restrict carriage movement, in letter spacing direction, an extent equal to displacement of said sector from said starting position and means for adjusting said index means to further vary the displacement of said sector to alter the movement of said carriage as defined by the original setting of said index means.

4. In a typewriter having a movable carriage, a plurality of manually operable keys, and a series of type bars each actuated upon depression of its corresponding key, mechanism for moving the carriage variable extents proportional to the width of the characters printed by said type bars comprising: an escapement member; separable driven connections between said member and carriage; an escapement sector normally engaged with said escapement member; means responsive to depression of said keys to disengage said escapement sector from said escapement member and subsequently reengage them; index means selectively settable in response to depression of any of said keys to vary the extent of movement imparted to said sector during the time it is disengaged from the escapement member; means to move said sector from a starting position during the time it is disengaged from said escapement member; means to return said sector to said starting position in unison with said escapement member whereby the carriage is moved in letter spacing direction during the return of said sector to its starting position and auxiliary means for adjusting said index means to decrease the amount of movement of said carriage as defined by the original setting of said index means.

5. In a typewriter or like printing machine having a movable carriage, a plurality of depressible typing keys, and a series of type bars each actuated upon depression of its corresponding key, a mechanism for moving the carriage variable extents as determined by the widths of the characters printed by said type bars comprising: an escapement gear; driving connections between said gear and the carriage; a spring urged escapement gear sector normally meshed with said escapement gear; means responsive to depression of any of said keys to disengage said gear and sector and cause free movement of the sector relatively to the gear; a group of stop index means individually settable in response to depression of any of said keys to predetermine the extent of movement imparted to said sector after it has been disengaged from said gear; carriage moving means for reversely moving said gear and sector in unison to control movement of said carriage an extent equal to the free movement of said sector relatively to said gear, and auxiliary means for adjusting the index stop means as a group to increase the amount of movement of the carriage as defined by the original setting of the stop means.

6. In a typewriter or like printing machine having a carriage, a plurality of depressible keys, a series of type bars actuated upon depression of their corresponding keys, and a variable feed mechanism for carriage spacing movement comprising: an escapement gear; driving connections between said gear and the carriage; a pivoted escapement sector normally in mesh with said gear, means for withdrawing said sector from meshing engagement with said gear upon depression of any of said keys; index stop means selectively settable under control of said keys to vary the movement of said sector upon withdrawal from meshing engagement with said gear; means for arresting reverse rotation of said sector after it has been re-engaged with said gear to effect carriage movement in variable extents as determined by the setting of said index means, means for moving the gear to backspace the carriage and a sector movement arresting means controlled by said gear moving means.

7. In a power operated typewriter or like printing machine having a movable carriage, a plurality of manually operated keys, and a series of bars each actuated upon operation of its corresponding key to control a power mechanism, means for moving the carriage varying extents proportional to the widths of characters printed and spacings of typed matter comprising: an escapement gear; driven connections between said gear and carriage; a toothed sector for meshing engagement with said gear for controlling the extent of rotation of said gear in carriage spacing movement; means including a plurality of stops selectively settable by the operation of said keys to control variable movements of said sector relatively to said gear, and means controlled by the movement of said gear in carriage return direction for disengaging said sector from mesh with said gear.

8. In a power operated typewriter, having a carriage spring urged in letter spacing direction, and power returned to left margin position, a plurality of manually operated character keys and type bar operating power mechanisms controlled by said keys; means for controlling the movements of the carriage in varying amounts proportional to the widths of characters printed and desired spacings of typed matter, comprising an escapement gear, driving connections between the gear and the carriage, a pivoted toothed sector for meshing engagement with said gear for controlling the extent of rotation of said gear in carriage spacing movement, a permutation unit including upper and lower case arms operated by said power mechanisms, a plurality of stops selectively settable by the arms of said permutation unit to control the variable movements of the sector relatively to said gear, and adjusting means common to each of said stops for changing the variable movements of said sector as initially set by said permutation unit.

9. A typewriter of the kind set forth in claim 8 wherein said adjusting means includes pin means for simultaneously moving said stops, and key controlled means for varying the operation of said stop moving pin means to provide for increase and decrease of the space defining movement of said sector.

10. A typewriter of the kind set forth in claim 8 wherein means are provided in one of said power mechanisms for backspacing operation of said escapement gear and a detent controlled by said backspacing means for blocking movement of said sector during said operation of the gear.

11. A typewriter of the kind set forth in claim 8 including a pin extending laterally from said sector, a cam adjacent said escapement gear, a spring for moving the cam upon operation of the gear when the carriage moves in carriage return direction and said cam engaging said pin to move the sector out of mesh with said escapement gear upon said movement of the latter.

12. A typewriter of the kind set forth in claim 11 including a control rod means movable longitudinally under impact of the carriage in power return movement, and a lever connected to said cam and movable by said rod means for locking the sector pin to block rebound movement of said sector.

13. In a typewriter including a movable carriage, a plurality of normally operated keys; means under control of said keys for controlling the movements of the carriage in varying amounts proportional to the widths of characters printed and spaces between typed matter; said control means comprising an escapement gear, driving connections between the gear and the carriage, a pivoted toothed sector for meshing engagement with said gear and swingable therewith for controlling the extent of rotation of said gear in letter spacing movement, a pivoted carrier for the sector, means controlled by a tabulating operation for rocking said carrier to withdraw the sector from mesh with said gear and latch means on said carrier and movable to block swinging operation of the sector prior to the rocking of said carrier.

14. In a typewriter including a movable carriage, a plurality of normally operated keys, means under control of said keys for controlling the movements of the carriage in varying amounts proportional to the widths of characters printed and spaces between typed matter, said control means including an escapement gear, driving connections between the gear and the carriage, a pivoted toothed sector for meshing engagement with said gear and swingable therewith for controlling the extent of rotation of said gear in letter spacing movement, a pivoted carrier for the sector, a rocker cam for moving the carrier to disengage and engage the sector with the gear, a lever arm actuated by the cam for moving the carrier to disengage the sector from the gear, and a return lever actuated by said cam for moving the carrier to engage the sector with the gear.

15. A typewriter of the kind set forth in claim 8 wherein said permutation unit includes stop setting means under control of a character key for controlling a space defining movement of the sector, an extend key means, and means controlled by said extend key means for varying the operation of said stop setting means as controlled by said character key to provide a different space defining movement of said sector.

16. In a typewriter or like printing machine having a movable carriage, carriage return means including margin stop means, a plurality of typing keys, a series of type bars each actuated upon depression of its corresponding typing key, variable spacing mechanism for the carriage comprising a movable escapement member, means detachably coupling said member and said carriage for movement therewith, an indexing mechanism operative in response to depression of any of said keys, a plurality of stops selectively settable by the indexing mechanism to vary the displacement of said movable escapement member and thereby control carriage movement in proportion to the widths of the characters printed by said type bars, a control rod movable under impact of said margin stop means, a spring on the rod yieldably resisting movement thereof, carriage return clutch means, lever means controlling the operation of said clutch means, said rod having an end bore, a spring in the bore and a plunger movable by the spring to operate said lever means when the spring in the bore is compressed by the impact movement of said rod after the spring on the rod is compressed to a predetermined extent.

References Cited in the file of this patent

UNITED STATES PATENTS

| | | |
|---|---|---|
| 2,111,410 | Stickney | Mar. 15, 1938 |
| 2,167,812 | Muller | Aug. 1, 1939 |
| 2,831,558 | Toggenburger | Apr. 22, 1958 |